United States Patent [19]
DeKoning et al.

[11] Patent Number: 6,067,635
[45] Date of Patent: May 23, 2000

[54] PRESERVATION OF DATA INTEGRITY IN A RAID STORAGE DEVICE

[75] Inventors: Rodney A. DeKoning; Donald R. Humlicek; Max L. Johnson; Curtis W. Rink, all of Wichita, Kans.

[73] Assignee: LSI Logic Corporation, Milpitas, Calif.

[21] Appl. No.: 08/923,228

[22] Filed: Sep. 4, 1997

Related U.S. Application Data

[63] Continuation of application No. 08/549,292, Oct. 27, 1995, abandoned.

[51] Int. Cl.[7] .................................................. G06F 11/00
[52] U.S. Cl. ................................. 714/6; 714/8; 711/114; 711/155
[58] Field of Search ................... 395/182.03, 182.04, 395/182.05, 182.06; 711/114, 112, 162, 155; 714/5, 6, 7, 8

[56] References Cited

U.S. PATENT DOCUMENTS

| | | | |
|---|---|---|---|
| 5,195,100 | 3/1993 | Katz et al. | 395/182.04 |
| 5,297,258 | 3/1994 | Hale et al. | 395/275 |
| 5,375,128 | 12/1994 | Menon et al. | 371/40.1 |
| 5,379,417 | 1/1995 | Lui et al. | 395/575 |
| 5,390,327 | 2/1995 | Lubbers et al. | 371/40.1 |
| 5,408,644 | 4/1995 | Schneider et al. | 395/575 |
| 5,418,921 | 5/1995 | Cortney et al. | 395/425 |
| 5,418,925 | 5/1995 | DeMoss et al. | 395/425 |
| 5,432,922 | 7/1995 | Polyzois et al. | 395/425 |
| 5,463,765 | 10/1995 | Kakuta et al. | 395/182.04 |
| 5,479,653 | 12/1995 | Jones | 395/182.03 |
| 5,490,248 | 2/1996 | Dan et al. | 395/182.04 |
| 5,497,457 | 3/1996 | Ford | 395/182.04 |
| 5,533,190 | 7/1996 | Binford et al. | 395/182.04 |
| 5,548,711 | 8/1996 | Brant et al. | 395/182.03 |
| 5,557,770 | 9/1996 | Bhide et al. | 395/488 |

OTHER PUBLICATIONS

Chen et al., "RAID: High Performance, Reliable Secondary Storage", ACM Computing Surveys, vol. 26, No. 2, pp. 145–185, Jun. 1994.

Primary Examiner—Dieu-Minh T. Le

[57] ABSTRACT

The invention relates to a method and apparatus for maintaining data/parity consistency in a RAID data storage system. The invention utilizes reserved disk storage space in the RAID array to log data necessary to restore data/parity consistency should an interruption event, such as a power failure, corrupt the data stored in a particular redundancy group. In one embodiment, the invention logs new data and new parity information to the reserved disk storage space before the new data and new parity information are written to the appropriate locations in the associated redundancy group. In this way, if an interruption event occurs when either the new data or the new parity information has already been written to the redundancy group but the other has not, the corresponding data and parity information stored in the reserved disk storage space can be used to restore data/parity consistency after the event has ended.

21 Claims, 3 Drawing Sheets

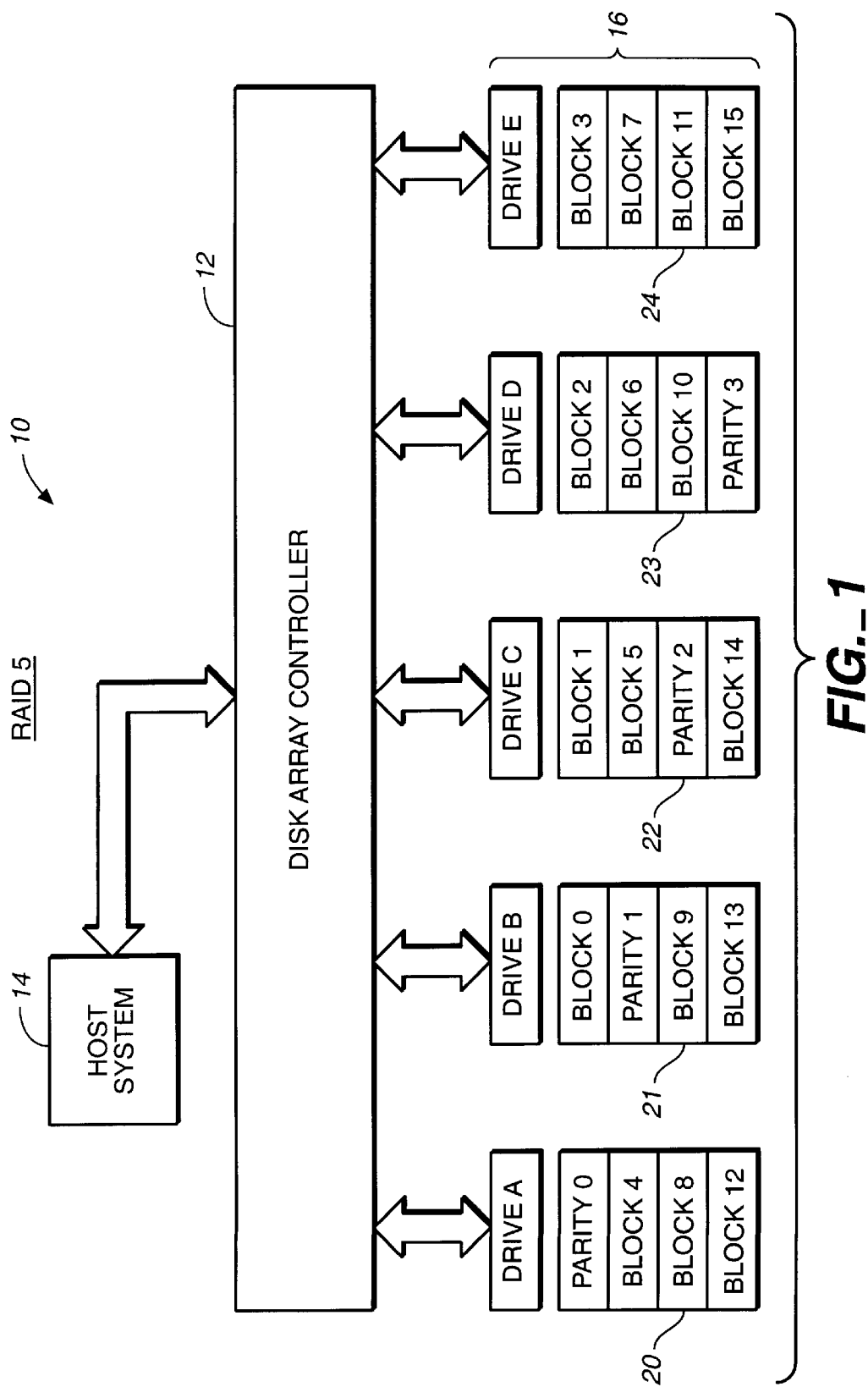
FIG._1

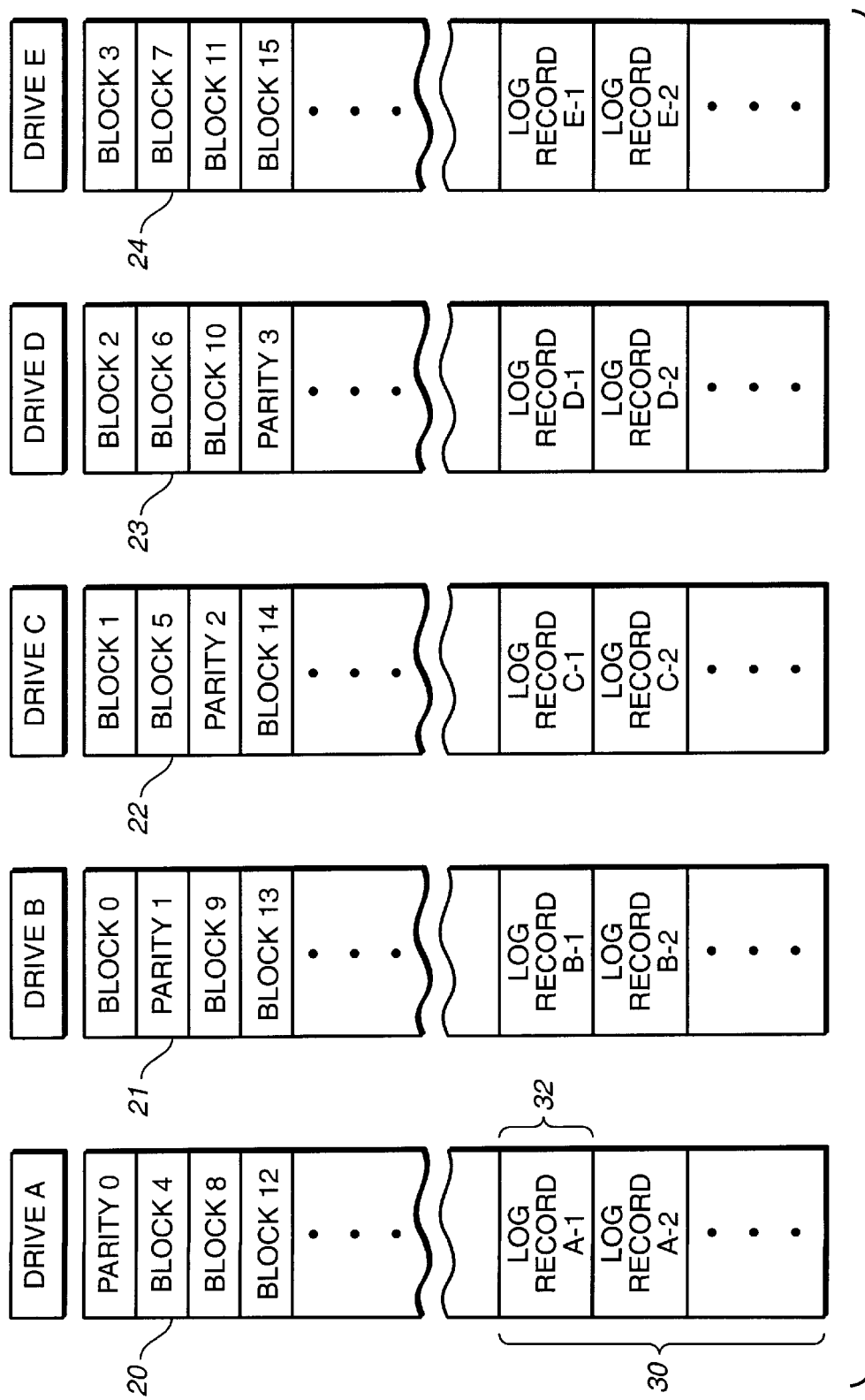
FIG._2

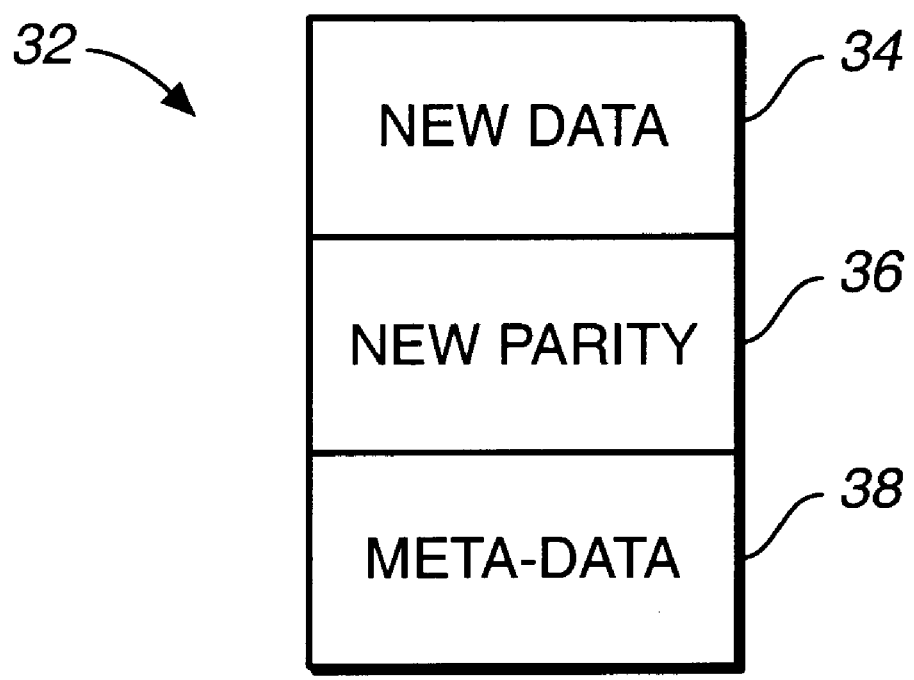
FIG._3

PRESERVATION OF DATA INTEGRITY IN A RAID STORAGE DEVICE

This is a continuation of application Ser. No. 08/549,292 filed on Oct. 27, 1995, now abandoned.

FIELD OF THE INVENTION

The invention relates, in general, to magnetic data storage systems and, in particular, to a method and apparatus for maintaining consistency between data and parity information in a disk array subsystem operating in degraded mode.

BACKGROUND OF THE INVENTION

Magnetic disk storage is currently the most widely used method of mass storage for computer systems. Traditionally, systems using this method of mass storage have included a single disk capable of storing large amounts of data. However, systems using an array of smaller capacity, less expensive disk drives are currently emerging as a low cost alternative to large single disk systems. These array systems are known as RAID (redundant array of independent drives) systems.

When used in conjunction with a host computer, a RAID system appears to behave just like a single disk system. RAID systems, however, offer many advantages over single disk systems. One of the most important advantages of RAID technology is the greatly improved system reliability it provides. Reliability is improved through the use of redundancy information in the array which allows the system to continue operating, in a degraded mode, even though one of the drives in the array has failed. The failed drive may then be replaced, and the lost data regenerated, without having to shut down the system. This is a great improvement over a single disk system which is rendered inoperable and may lose valuable data if the one disk in the system fails.

RAID technology encompasses a series of techniques for managing the operation of multiple disks. These techniques are discussed in an article entitled "A Case for Redundant Arrays of Inexpensive Disks (RAID)" by Patterson, Gibson, and Katz of the University of California (Report No. UCB/CSD 87/391, December 1987) which categorizes the different techniques into five RAID "levels" and is hereby incorporated by reference. Each RAID level represents a different approach to storing and retrieving data and the associated redundancy information across the array of disk drives.

For example, FIG. 1 illustrates one embodiment of a RAID level 5 data storage system 10. As seen in the figure, the system 10 comprises: an array of disk drives 16, identified as DRIVE A through DRIVE E; a disk array controller 12; and a host computer 14. The host computer 14 delivers I/O requests to the disk array controller 12 requesting that certain read/write operations be performed. The controller 12 coordinates the transfer of data between the host computer 14 and the array of disk drives 16 according to RAID level 5 techniques in response to those requests. In addition, the controller 12 calculates and stores the required redundancy information, which in a RAID level 5 system comprises parity information. The parity information is simply a collection of parity bits which are binary digits used to make the sum of all the digits across each redundancy group either an even or odd number.

Blocks 20 through 24 in FIG. 1 illustrate the manner in which data and parity information are stored on the five array drives in system 10. Data is stored in data blocks identified as BLOCK 0 through BLOCK 15. Parity information is stored in parity blocks identified as PARITY 0 through PARITY 3. Each parity block is associated with four corresponding data blocks, all located on a common "stripe" across the five array drives, to form a redundancy group. The parity information stored in the parity block of any particular redundancy group is calculated using the data stored in the four corresponding data blocks. Consequently, if the data stored in one of the data blocks of a redundancy group is changed, the corresponding parity information must be updated.

Because there is a direct relationship between the data stored in a redundancy group and the corresponding parity information, if some of the data in the group is lost, such as by the failure of one of the disk drives in the array, the parity information may be used to reconstruct the lost data. In this way, the system 10 can continue to perform read and write operations even before the failed drive is replaced. It should be apparent, however, that in order for the system 10 to maintain the increased reliability provided by the above-described technique, it is mandatory that the system maintain consistency between the data and the parity information stored in each of its redundancy groups.

A problem can arise when the system 10 is performing a write operation. The problem stems from the fact that, during a write operation, new data and new parity information are normally written to the redundancy groups at different times. Therefore, if a system interruption, such as a loss of system power, occurs during the write operation, a condition may result where either the new data or the new parity information has been written to the redundancy group without the other. This creates an inconsistency between data and parity within the array 16 which can, in certain circumstances, negatively effect the system's ability to operate properly. For example, if one of the drives in the array fails, it will be impossible to read the data block corresponding to the failed drive in a redundancy group containing inconsistent data/parity information. In addition, a retry of the write operation interrupted during the power failure will not correct the inconsistency in the redundancy group.

Therefore, a need exists for a method and apparatus for preserving the data/parity consistency in a RAID system.

SUMMARY OF THE INVENTION

The invention relates to a method and apparatus for maintaining data/parity consistency in a RAID data storage system. The invention utilizes reserved disk storage space in the RAID array to log data necessary to restore data/parity consistency should an interruption event, such as a power failure, corrupt the data stored in a particular redundancy group. In one embodiment, the invention logs new data and new parity information to the reserved disk storage space before the new data and new parity information are written to the appropriate locations in the associated redundancy group. In this way, if an interruption event occurs when either the new data or the new parity information has already been written to the redundancy group but the other has not, the corresponding data and parity information stored in the reserved disk storage space can be used to restore data/parity consistency after the event has ended. The invention is of particular value in RAID systems which use the read-modify-write method to update parity information.

In one aspect of the present invention, a process is provided for use in a method for restoring consistency between data and parity information stored in redundancy groups in a disk array subsystem following an event which interrupts the execution of one or more write operations. More specifically, the process comprises: (a) reserving log space on at least one of the disk drives in the array of disk drives; (b) receiving a write request from a host system requesting that new data be written to a first data storage area in a predetermined redundancy group within the array of disk drives; (c) reading old data from the first data storage area in the predetermined redundancy group and old parity information from a first parity storage area in the predetermined redundancy group; (d) using the old data, the old parity information, and the new data to calculate new parity information; (e) first writing the new data and the new parity information to the log space; and (f) second writing, after the step of first writing, the new data and the new parity information to the first data storage area and the first parity storage area, respectively, in the predetermined redundancy group.

In one embodiment of the present invention, the new data and new parity information stored in the reserved log space is used to restore consistency in a redundancy group after the occurrence of an interruption event. To accomplish this, the new data and new parity information can be simply transferred to proper locations within the redundancy group. The interruption event may include: a low power condition, a device reset, a controller device failure, or other similar event. In another embodiment of the present invention, the disk array subsystem includes a RAID device operating in degraded mode. In this embodiment, the first data storage area and the second data storage area may both reside on survivor drives in the array. In yet another embodiment, data identifying the predetermined redundancy group is also stored in the reserved log space. This allows a controller to determine where the new data and the new parity information stored in the reserved log space should be transferred if an interruption event occurs.

In another aspect of the present invention, a method for restoring consistency between data and redundancy information in a RAID data storage system having an array of disk drives, wherein the array of disk drives includes a plurality of redundancy groups each including a data portion and a redundancy information portion, is provided. More specifically, the method comprises: (a) reserving log storage space in the array of disk drives; (b) receiving new data to be stored in the data portion of a first redundancy group in the array of disk drives in accordance with a predetermined RAID technique, from a host computer; (c) using the new data to calculate new redundancy information for the first redundancy group; (d) first storing the new data and the new redundancy information in the reserved log storage space; (e) second storing the new data and the new redundancy information in the data portion and the redundancy portion, respectively, of the first redundancy group, after the step of first storing; and (e) using the new data and the new redundancy information stored within the reserved log storage space to restore consistency between data and redundancy information in the first redundancy group after the occurrence of an interruption event which interrupts the operation of the system during the step of second storing.

In a third aspect of the present invention, a method is provided for restoring consistency between data and redundancy information in a RAID data storage system having an array of disk drives, wherein the array of disk drives includes a plurality of redundancy groups each including a data portion and a redundancy information portion, the method comprising the steps of: (a) reserving log storage space in the array of disk drives; (b) receiving new data to be stored in the data portion of a first redundancy group in the array of disk drives in accordance with a predetermined RAID technique, from a host computer; (c) using the new data to calculate new redundancy information for the first redundancy group; (d) storing information in the reserved log storage space capable of restoring consistency between data and redundancy information stored in the first redundancy group should the first redundancy group become corrupted; (e) storing the new data and the new redundancy information in the data portion and the redundancy portion, respectively, of the first redundancy group, after the step of storing information; and (f) using the information stored in the reserved log storage space to restore consistency between data and redundancy information in the first redundancy group after the occurrence of an interruption event which interrupts the operation of the system during the step of second storing.

In one embodiment, the information stored in the reserved log storage space includes old data and old redundancy information from the first redundancy group. In another embodiment, the information stored in the reserved log storage space includes the new data and the new redundancy information.

In a last aspect of the present invention, a disk array subsystem capable of maintaining consistency between data and redundancy information stored in redundancy groups within an array of disk drives is provided. More specifically, the subsystem comprises: (a) a logging area within the array of disk drives; (b) means for coordinating the performance of write operations to the array of disk drives, the means capable of receiving new data from a host computer to be delivered to a predetermined redundancy group in the array of disk drives; (c) means for calculating new redundancy information for the predetermined redundancy group using the new data; (d) means for delivering the new data and the new redundancy information to the logging area in the array of disk drives; (e) means for delivering the new data and the new redundancy information to the predetermined redundancy group after they have been delivered to the logging area; and (f) means for reading the logging area and for using the information stored in the logging area to restore consistency between data and redundancy information in the predetermined redundancy group after the occurrence of an interruption event which interrupts the performance of a corresponding write operation.

BRIEF DESCRIPTION OF THE DRAWINGS

FIG. 1 illustrates a typical RAID level 5 data storage system;

FIG. 2 illustrates a data configuration for the array of disk drives in one embodiment of the present invention; and FIG. 3 illustrates a data configuration for the log record of FIG. 2 in one embodiment of the present invention.

DETAILED DESCRIPTION

The invention relates to a method and apparatus for maintaining data/parity consistency in a RAID data storage system. The invention utilizes reserved disk storage space in the RAID array to log data necessary to restore data/parity consistency should an interruption event, such as a power failure, corrupt the data stored in a particular redundancy group. In one embodiment, the invention logs new data and new parity information to the reserved disk storage space before the new data and new parity information are written to the appropriate locations in the associated redundancy group. In this way, if an interruption event occurs when either the new data or the new parity information has already been written to the redundancy group but the other has not, the corresponding data and parity information stored in the reserved disk storage space can be used to restore data/parity consistency after the event has ended. The invention is of particular value in RAID systems which use the read-modify-write method to update parity information.

The invention will be described as implemented in a RAID level 5 data storage system. It should be appreciated, however, that the invention may be implemented in any RAID system where data and redundancy information is written to the array at different times. In a RAID level 5 system, data is block interleaved among all of the drives in the array 16 with interspersed parity information. FIG. 1 illustrates one method of achieving this data/parity distribution. In FIG. 1, each parity block stored in the array corresponds to 4 data blocks to form a redundancy group, i.e., PARITY 0 corresponds to BLOCKs 0, 1, 2, and 3 to form a first redundancy group, PARITY 1 corresponds to BLOCKs 4, 5, 6, and 7 to form a second redundancy group, etc. The parity blocks are "staggered" among the drives so that each drive contains some parity information.

The parity information stored in the parity block of any particular redundancy group is calculated using the data stored in the 4 corresponding data blocks. The most common method of calculating the parity information is by performing a bit wise exclusive-OR (XOR) operation on the data stored in the blocks. Because the parity information stored in the parity block of a redundancy group depends upon the data stored in the corresponding data blocks, the parity information must be updated if the data stored in any of the corresponding data blocks is changed during, for example, a write operation.

In a system which utilizes the bit wise XOR operation to calculate the parity information, the relationship between the parity and data blocks is as follows:

PARITY 0=(BLOCK 0) XOR (BLOCK 1) XOR (BLOCK 2) XOR (BLOCK 3) PARITY 1=(BLOCK 4) XOR (BLOCK 5) XOR (BLOCK 6) XOR (BLOCK 7) PARITY 2=(BLOCK 8) XOR (BLOCK 9) XOR (BLOCK 10) XOR (BLOCK 11)
PARITY 3=(BLOCK 12) XOR (BLOCK 13) XOR (BLOCK 14) XOR (BLOCK 15)

Therefore, when the data stored within one of the data blocks of a redundancy group is changed, such as during a write operation, the new parity information for the redundancy group can be calculated by reading the contents of all of the other data blocks within the group and XORing that data with the new data. However, in an alternative method, known as the read-modify-write method, calculation of the new parity information can be accomplished in a more efficient fashion by simply reading the old data from the data block being changed and the old parity information from the corresponding parity block and applying the following equation:

new parity=(old data XOR old parity) XOR new data.

The read-modify-write method is advantageous in that only the data and parity drives which will be updated need to be accessed during the write operation, whereas all the drives in the array will have to be read or accessed to perform the previously described method.

Drive utilization efficiency may be improved by modifying the read-modify-write process, separating the execution of data read and write operations from the execution of parity read, generation and write operations. This modified read-modify-write operation identifies the disk drives containing the data and parity to be updated and places the proper read and write requests into the I/O queues for the identified data and parity drives, scheduling some or all parity operations (i.e., reading old parity information from the parity drive, generating new parity information, and writing the new parity information to the parity drive) for execution when best accommodated in the I/O queue for the parity drive, following the read of old data from the data drive.

When using any of the above-described methods for updating the parity information in a redundancy group, actual write transfers of new data and new parity to the associated blocks in the redundancy group need not occur at the same time. If either the new data or the new parity is written prior to a system interruption or failure, but the other is not, the contents of the redundancy group will be inconsistent, i.e., the parity information will not be in agreement with the data stored within the redundancy group. A subsequent retry of the write operation interrupted during the system failure will not correct the inconsistencies in the redundancy group.

In accordance with the present invention, storage space is reserved somewhere in the array of disk drives 16 for the logging of information necessary to restore consistency between the data and parity information of redundancy groups which were undergoing a write operation during a system interruption. FIGS. 2 and 3 illustrate one method of storing information in the array of disk drives in accordance with the present invention. As seen in FIG. 2, a logging area 30 is reserved on each disk in the array. The logging area 30 is comprised of a plurality of log records 32, each record corresponding to a particular redundancy group which may contain corrupted data. In one approach, the log records stored on a particular disk correspond to redundancy groups for which the parity block is stored on the same disk. In another approach, the log records stored on a particular disk correspond to redundancy groups for which the data block which was the subject of the interrupted write operation is stored on the same disk. In yet another approach, there is no correspondence between the location of a log record and the associated redundancy group.

FIG. 3 illustrates the configuration of a log record 32 in one embodiment of the present invention. As seen in the figure, the log record 32 includes a new data portion 34, a new parity portion 36, and a meta-data portion 38. In this embodiment of the invention, the disk array controller 12, after receiving the new data and calculating the new parity information corresponding to a particular write request, writes the new data, the new parity information, and data indicative of the location of the associated data block and parity block in the array to the new data portion 34, the new parity portion 36, and the meta-data portion 38 of the log record 32 all in a single I/O operation.

A description of the operation of the above-described embodiment of the present invention will now be made. During normal operation, all of the disk drives in the array 16 will be operative. The disk array controller 12 receives a write request from the host computer 14 requesting the controller 12 to store specific data to a certain location in the array 16. The controller 12 determines which data block in the array 16 to write the new data to and proceeds to read the data stored in that data block and the parity information stored in the associated parity block. The controller 12 then uses this information, along with the new data received from the host computer 14, to calculate the new parity information.

After the new parity information has been calculated, the controller transfers the new data and the new parity information to the new data section 34 and the new parity section 36 of the next available log record 32 in the logging area 30 of the appropriate disk. The controller also writes the required identifying data to the meta-data section 38 of the log record 32. Only after the transfers have been successfully completed does the controller 12 begin to transfer the new data and the new parity information to the appropriate data block and parity block, respectively, of the corresponding redundancy group. After the new data and the new parity information have been successfully transferred to the redundancy group, the controller can erase all of the associated information from the log record 32. In this way, the logging area 30 will only contain information relating to potentially corrupted redundancy groups.

At any time during the operation of the RAID system, an event may occur which interrupts the operation of the system. This interruption event may include, for example, a power failure, a component failure, or a system reset. If the event occurs during the performance of a write operation, non-consistencies may result between data and parity in the array. If the event occurs before the controller 12 begins to transfer the new data and the new parity information to the redundancy group then no inconsistencies will result because the old data and the old parity information, which are consistent, will still be in place. Similarly, if the event occurs after the transfer of the new data and the new parity information to the redundancy group is complete, no inconsistencies will result because the new data and the new parity information is consistent. However, if the transfers to the media are only partially completed when the interruption event occurs (i.e., the new data has been written to the media but the new parity has not, or vice versa), inconsistencies will result between the data and parity information stored in the subject redundancy group.

After the system 10 recovers from an interruption event, a re-initialization procedure will be executed. During this re-initialization procedure, the system 10 will check all of the logging areas 30 to determine whether log records 32 have been created which were not subsequently erased. If such log records exist, the controller 12 will check each record to see if it is complete. If a record 32 is not complete, then the transfer of new data and new parity information to the redundancy group never began and non-consistencies were not created. If a record 32 is complete, the controller 12 will read the meta-data section 38 of the log record and transfer the corresponding new data and new parity information to the appropriate locations in the array, thereby restoring consistency to the associated redundancy group.

In another embodiment of the present invention, the information logged to a log record 32 in logging area 30 does not have to be erased after the new data and the new parity information is successfully written to the appropriate redundancy group. Instead, the controller 12 creates another log which lists the addresses of log records 32 which correspond to potentially corrupted redundancy groups. After the controller 12 detects the initiation of an interruption event, it examines the current drive activities to identify unfinished write operations. It then delivers the address of the log record corresponding to each of the unfinished write operations to the new log. At re-initialization, the controller 12 checks the new log and only performs transfers of new data and new parity for log records identified therein.

As described previously, the present invention has special application in RAID systems operating in degraded mode. In fact, in one embodiment of the present invention, information is logged to the array of disk drives 16 only during degraded mode operation. The reason the invention is of particular value during degraded mode operation is because some of the information in each redundancy group will be unavailable in degraded mode, making it impossible to correct data/parity inconsistencies even if they are known to exist. For example, if drive D in the system 10 of FIG. 1 fails, then even if it is known that a data/parity inconsistency exists in the redundancy group which includes the PARITY 0 block, it is impossible to restore consistency to the group because the data which should be stored in BLOCK 2 is unknown. If the system 10 were not operating in degraded mode, it would only be necessary to read and bit wise XOR the data stored in BLOCKs 0, 1, 2, and 3 to calculate the proper parity information and hence restore consistency to the group.

Another reason the invention is of particular value during degraded mode is because parity information is of heightened importance during degraded mode. For example, in a degraded system, if the host computer 14 requests that data be read from a data block which resides on a failed drive, the requested data can be generated by reading and processing the data from all of the other data blocks in the corresponding redundancy group and the parity information in that group. If the data/parity information in the group is inconsistent, the requested data cannot be properly recovered.

The present invention is also of particular value in systems which utilize redundant controller configurations. A redundant controller configuration is simply a configuration which uses two or more controllers so that if one of the controllers fails, the other one can take over without having to shut down the system. Because the log data is written to the disks in the array, the subordinate controllers have full access to the data for use in restoring data/parity consistency. This is in contrast to systems which store log data in a non-volatile memory in the controller and, therefore, lose the log data if the primary controller fails.

Although the present invention has been described in conjunction with its preferred embodiment, it is to be understood that modifications and variations may be resorted to without departing from the spirit and scope of the invention as those skilled in the art readily understand. For example, all of the disk space reserved for logging of information may reside on a single disk in the array, or any combination of disks. Also, the information logged to the reserved disk area does not have to include the new data and the new parity information. Instead, it may include the old data and the old parity information or any other combination adequate to restore consistency to the subject redundancy group. Such modifications and variations are considered to be within the purview and scope of the invention and the appended claims.

What is claimed is:

1. A method for restoring consistency between data and parity information stored in a disk array subsystem using a Read-Modify-Write operation to said disk array, said method comprising the steps of:

reserving a primary log space on one of a plurality of disk drives in said disk array wherein said primary log space is adapted to store log records comprising data and parity information adequate to restore consistency of data and parity in said disk array subsystem, wherein said data and parity information is derived from receipt of a write request;

writing said data and parity information to a log record in said primary log space in response to receipt of said write request to said disk array;

maintaining a secondary log to identify log records in said primary log space;

executing said write request, in response to completion of said writing step, to store said data and parity information in said disk array subsystem in accordance with Read-Modify-Write operation techniques;

determining that said step of executing said write request has not completed wherein the step of determining includes the step of searching said secondary log to locate log records in said primary log space identifying incomplete write requests; and writing said data and parity information stored in said log record to said disk array in response to the determination that execution of said write request has not completed.

2. The method of claim 1 further comprising the step of:

erasing said log record in response to completing said step of executing said write request to said disk array subsystem in accordance with Read-Modify-Write operation techniques.

3. The method of claim 1 further comprising the steps of:

deleting entries in said secondary log in response to completing said step of executing said write request to said disk array subsystem in accordance with Read-Modify-Write operation techniques.

4. The method of claim 1 wherein said step of writing said data and parity information to a log record comprises the step of:

writing new data and new parity information to said log record, wherein said new data and new parity information are derived from said write request.

5. The method of claim 1 wherein said step of writing said data and parity information to a log record comprises the step of:

writing old data and old parity information to said log record, wherein said old data and old parity information are read from said disk array subsystem in response to receipt of said write request.

6. The method of claim 1 wherein said disk array subsystem is operating in degraded mode.

7. The method of claim 1 wherein said step of reserving a primary log space on one of a plurality of disk drives includes the step of:

reserving a primary log space on each of said plurality of disk drives.

8. A method for restoring consistency between data and parity information stored in a disk array subsystem following the interruption a Read-Modify-Write operation to said disk array, said method comprising the steps of:

reserving a primary log space on one of a plurality of disk drives in said disk array wherein said primary log space is adapted to store log records comprising data and parity information adequate to restore consistency of data and parity in said disk array subsystem, wherein said data and parity information is derived from receipt of a write request;

writing said data and parity information to a log record in said primary log space in response to receipt of said write request to said disk array;

maintaining a secondary log to identify log records in said primary log space;

executing said write request, in response to completion of said writing step, to store said data and parity information in said disk array subsystem in accordance with Read-Modify-Write operation techniques;

determining that an interruption occurred during said step of executing said write request in accordance with Read-Modify-Write operation techniques wherein the step of determining includes the step of searching said secondary log to locate log records in said primary log space identifying incomplete write requests; and writing said data and parity information stored in said log record to said disk array in response to the determination that an interruption occurred during said step of executing said write request.

9. The method of claim 8 further comprising the step of:

erasing said log record in response to completing said step of executing said write request to said disk array subsystem in accordance with Read-Modify-Write operation techniques.

10. The method of claim 8 further comprising the steps of:

deleting entries in said secondary log in response to completing said step of executing said write request to said disk array subsystem in accordance with Read-Modify-Write operation techniques.

11. The method of claim 8 wherein said step of writing said data and parity information to a log record comprises the step of:

writing new data and new parity information to said log record, wherein said new data and new parity information are derived from said write request.

12. The method of claim 8 wherein said step of writing said data and parity information to a log record comprises the step of:

writing old data and old parity information to said log record, wherein said old data and old parity information are read from said disk array subsystem in response to receipt of said write request.

13. The method of claim 8 wherein said disk array subsystem is operating in degraded mode.

14. The method of claim 8 wherein said step of reserving a primary log space on one of a plurality of disk drives includes the step of:

reserving a primary log space on each of said plurality of disk drives.

15. An apparatus for restoring consistency between data and parity information stored in a disk array subsystem following the interruption a Read-Modify-Write operation to said disk array, said apparatus comprising:

a primary log space on one of a plurality of disk drives in said disk array wherein said primary log space is adapted to store log records comprising data and parity information adequate to restore consistency of data and parity in said disk array subsystem, wherein said data and parity information is derived from receipt of a write request;

means for writing said data and parity information to a log record in said primary log space in response to receipt of said write request to said disk array;

a secondary log to identify log records in said primary log space;

means for executing said write request, in response to completion of said writing means, to store said data and parity information in said disk array subsystem in accordance with Read-Modify-Write operation techniques;

means for determining that an interruption occurred during said means of executing said write request in accordance with Read-Modify-Write operation techniques wherein said means for determining includes means for searching said secondary log to locate log records in said primary log space identifying incomplete write requests; and means for writing said data and parity information stored in said log record to said disk array in response to the determination that an interruption occurred during said means of executing said write request.

16. The apparatus of claim 15 further comprising:

means for erasing said log record in response to completing said execution of said write request to said disk array subsystem in accordance with Read-Modify-Write operation techniques.

17. The apparatus of claim 15 further comprising:

means for deleting entries in said secondary log in response to completing said means of executing said write request to said disk array subsystem in accordance with Read-Modify-Write operation techniques.

18. The apparatus of claim 15 wherein said means for writing said data and parity information to a log record comprises:

means for writing new data and new parity information to said log record, wherein said new data and new parity information are derived from said write request.

19. The apparatus of claim 15 wherein said means for writing said data and parity information to a log record comprises:

means for writing old data and old parity information to said log record, wherein said old data and old parity information are read from said disk array subsystem in response to receipt of said write request.

20. The apparatus of claim 15 wherein said disk array subsystem is operating in degraded mode.

21. The method of claim 15 wherein said means for reserving a primary log space on one of a plurality of disk drives includes:

means for reserving primary log space on each of said plurality of disk drives.

* * * * *